July 24, 1962

G. J. DUPRE 3,045,539

COPY CAMERA

Filed Jan. 10, 1961

INVENTOR.
Gilbert J. Dupre.
BY

July 24, 1962 G. J. DUPRE 3,045,539
COPY CAMERA
Filed Jan. 10, 1961 3 Sheets-Sheet 2
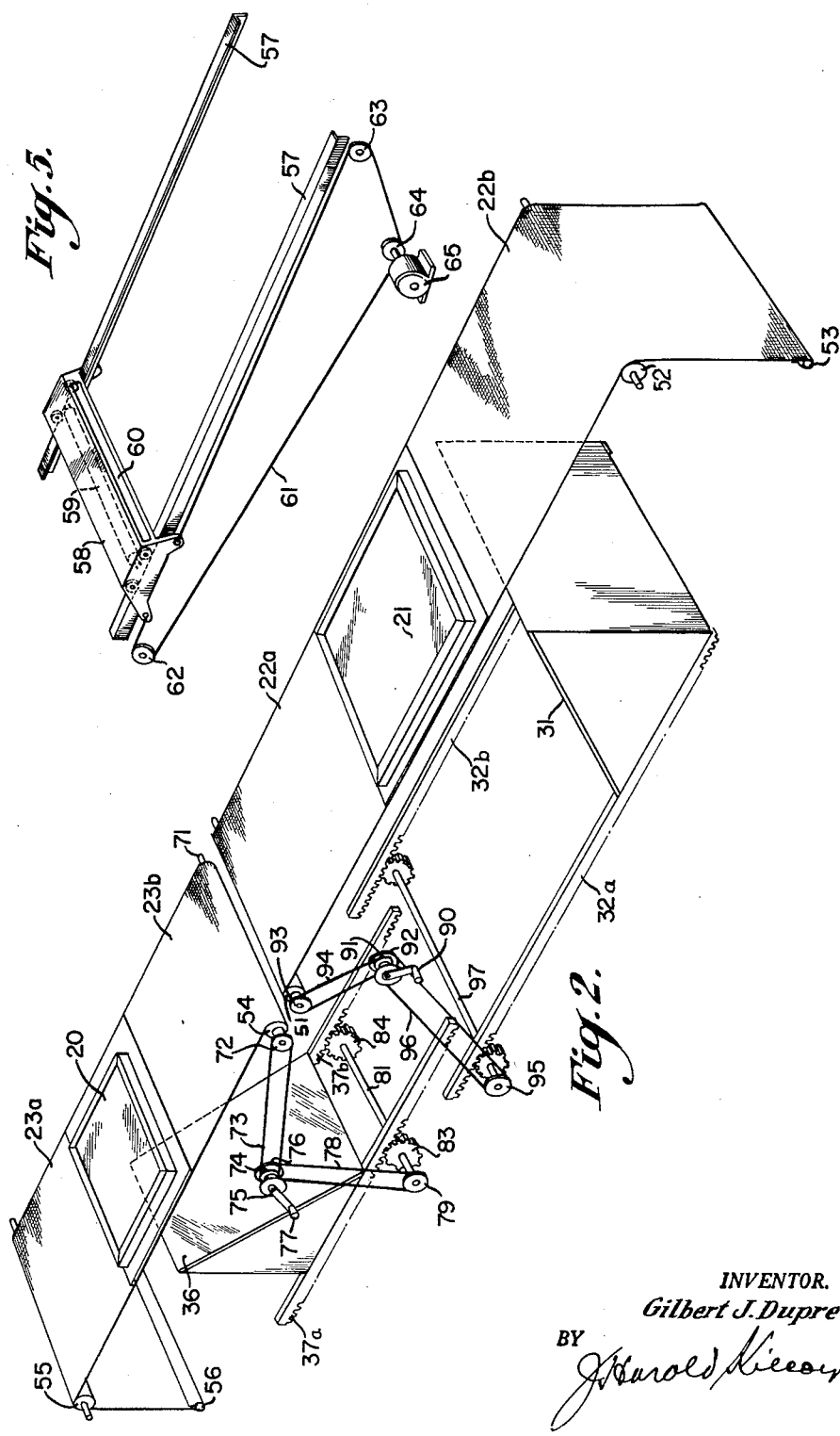
INVENTOR.
Gilbert J. Dupre.
BY July 24, 1962 G. J. DUPRE 3,045,539
COPY CAMERA
Filed Jan. 10, 1961 3 Sheets-Sheet 3
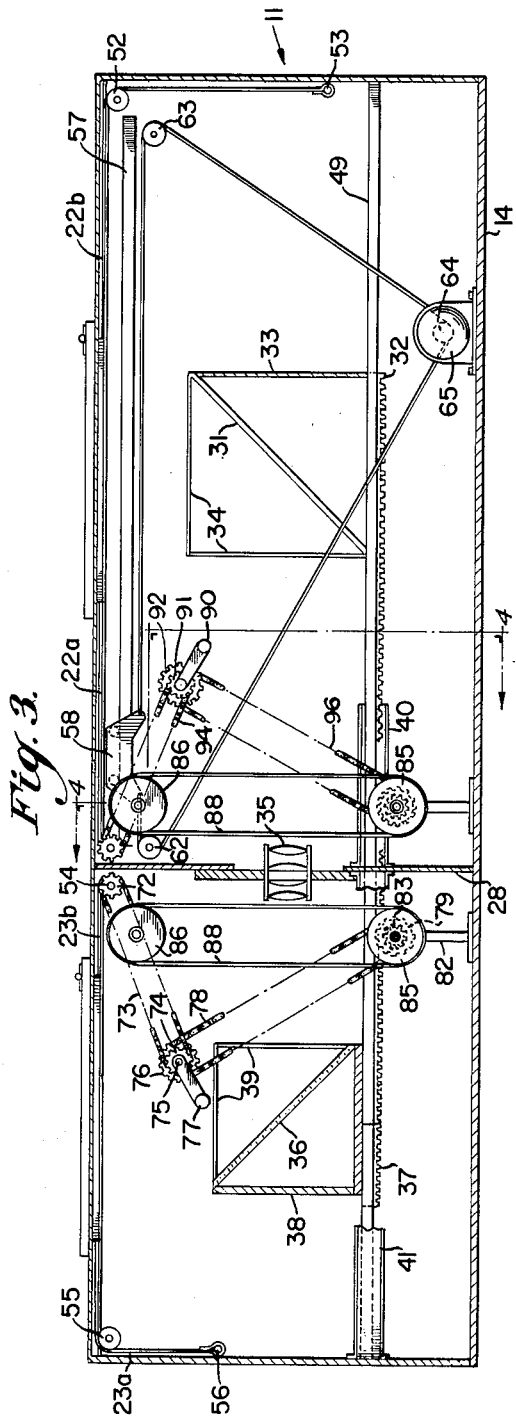
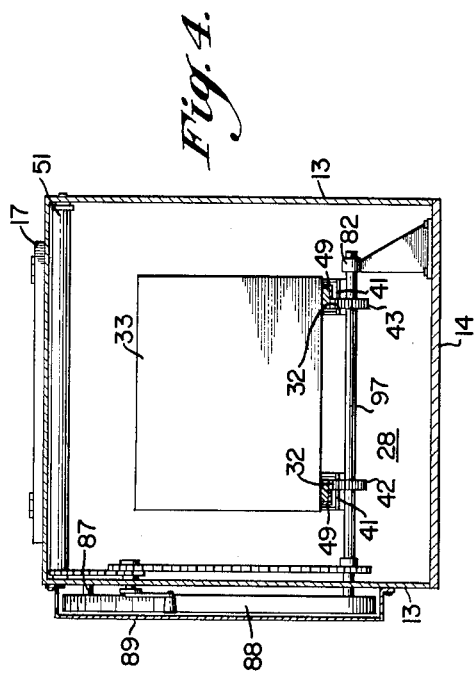
INVENTOR.
Gilbert J. Dupre.
BY United States Patent Office 3,045,539
Patented July 24, 1962

3,045,539
COPY CAMERA
Gilbert J. Dupre, 2007 Cedardale Ave., Baton Rouge, La.
Filed Jan. 10, 1961, Ser. No. 81,779
7 Claims. (Cl. 88—24)

This invention relates to copy cameras. More particularly, this invention relates to a copy camera which is an entirely self-contained unit.

The art is replete with many types of photographic copying devices where the graphic material is to be copied either by direct print contact or by reduction or enlargement by means of a suitable lens system. However, in most instances when an enlargement or reduction of the graphic material is desired, or when a projection copy is to be made, the usual operation is to position the graphic material in a hinged or pivoting copy holder frame which is mounted onto the bed of a horizontal camera. This arrangement requires that the camera bed and the frame holding the copy be constructed of heavy and expensive materials in order to hold the graphic material securely and parallel with the lens and film plane when said pivoting or hinged frame is tilted to a vertical position after loading. This latter operation requires the operator to take several steps between the graphic material to be reproduced and the film holder at the opposite end of the camera. Also, this type of camera requires a bellows, and it is necessary to have the lens on a support constructed of heavy and expensive materials in order to keep it secure and parallel with the graphic material or copy plane and the film plane.

Another type of camera device employed for this type of operation is a vertical camera. Unfortunately, this type of device presents the same disadvantages as the horizontal units described above and, in addition, inasmuch as the graphic material to be reproduced is necessarily placed in a holder near the floor with the sensitized material higher than a convenient level, the operator is required to stoop to load the copy holder and lift the film holder to an inconvenient height. Such an arrangement contributes to operator fatigue.

Another disadvantage of this type of device is the fact that a lens of inadequate focal length must be employed in order to keep the graphic material to be reproduced and the sensitized material holder within reach of the operator without a ladder. Both of these types of cameras permit extraneous light to strike the lens surface thereby causing lens flare on the sensitized material. This is a contributing factor to the inferior quality of the reproduction. It is apparent that the light source employed on these cameras requires excessive floor space and is difficult to adjust for uniform lighting of the graphic material to be reproduced.

Accordingly, it is the primary object of the present invention to provide a novel and improved camera which is completely self contained and can be constructed with less expensive materials.

It is another object of the present invention to provide a camera having a stationary lens and a unit which makes possible the disposition of the graphic material holder and sensitized holder on a common plane or approximately a common plane and with both supported by a single member for permanent positive alignment.

It is another object of the present invention to provide a camera incorporating a unique traveling light source for speed and uniformity of lighting and an opaque curtain which completely eliminates lens flare by virtue of its shutting out of all extraneous light.

It is another object of the present invention to provide a camera which conserves floor space and which provides a graphic material holder and a sensitized material holder at a convenient height which facilitates operation without taking a step or stooping on the part of the operator.

These, together with other objects and advantages which will become subsequently apparent, reside in the details of construction and operation as more fully hereinafter described and claimed, reference being had to the accompanying drawings forming a part hereof, wherein like numerals refer to like parts throughout, and in which:

FIGURE 2 is a diagrammatic and perspective view of the driving arrangement for the moving parts for focusing the camera.

FIGURE 3 is a longitudinal section of the invention.

FIGURE 4 is a cross sectional view along lines 4—4 of FIGURE 3.

FIGURE 5 is a diagrammatic and perspective view of the light arrangement of the present invention.

Figure 1:
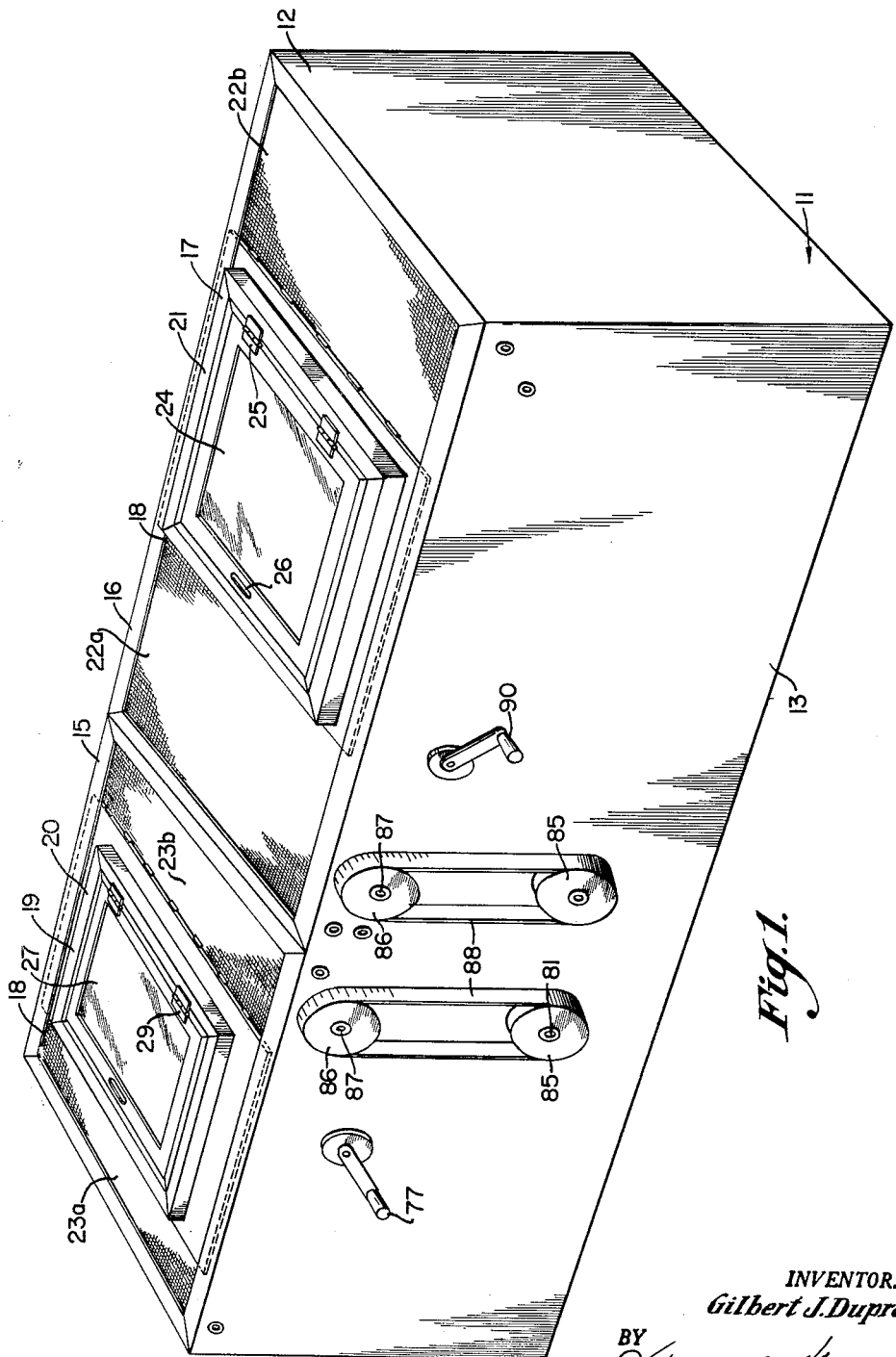
FIGURE 1 is a perspective view of the camera device.

Now turning to FIGURE 1, it will be seen therefrom that the camera of the present invention includes a rectangularly shaped housing 11. The housing 11 is constructed of like end walls 12 at either end, and like side walls 13. Additionally, the housing contains a bottom 14, not shown in FIGURE 1, but which can be seen in FIGURES 3 and 4. A frame 15 and a frame 16 are secured to the uppermost portion of the housing 11. Both frames have inwardly facing longitudinal channels (not shown) along the sides 18 of the respective frames. Slidably mounted in the channels of the frame 15 is a film holder 20, while a graphic copy holder 21 is slidably mounted in the channels of frame 16. A curtain 22a and 22b is secured along two ends of the copy holder 21. The curtains extend between sides 18 and have a dimension so that they ride in their respective channels of frame 16. Curtains 23a and 23b are likewise secured to the ends of film holder frame 20, and are also adapted to slide in the channels provided in sides 18 of frame 15.

It is stated that the camera of the present invention is divided into two light-tight compartments; yet both the film holder and the graphic copy holder may be moved along a horizontal plane.

Graphic copy holder 21 consists of a glass plate (not shown) positioned within a frame 17. A suitable door 24 is dimensioned to tightly fit within the frame 17. This door 24 is shown to be hinged at 25 and is provided with a conventional door pull 26. The film holder 20 is constructed in the same manner, in that a glass plate (not shown) is positioned within a frame 19 and a door 27 is hinged at 29 and positioned to fit within the frame 19. The graphic material which is to be copied is sandwiched between the glass and the door 24. On the other hand, the film which is to receive the exposure is positioned or sandwiched between the glass and the door 27. It will be apparent that other types of film holding arrangements may be provided and mounted within the film holder 20. It is thought that a roll film holder may be suitably employed as well as a variety of film packs.

As has been stated above, the film holder 20 and the graphic copy holder 21 are movable along a horizontal plane. This movement occurs between the end walls and is controlled by an ingenious driving mechanism. Before taking up a discussion of the driving mechanisms for moving the film holder 20 and the graphic copy holder 21, attention is directed to FIGURE 3, which is a longitudinal section of the camera. Within the housing 11, a front surfaced mirror 31 is positioned at a 45° angle and is situated below copy holder 21. This mirror 31 is mounted on a rack arrangement 32. It is supported on the rack by upright support 33. Additionally, being a front surfaced mirror it is protected from dust and the like by optically coated glass covers 34. The mirror 31 is further encompassed by two side walls (not shown) which may be opaque. The mirror is positioned to reflect the graphic material perpendicularly toward partition 28 which separates the housing 11 into two light tight compartments. Within an opening in partition 28 a lens 35 is positioned to receive and focus the produced image of the graphic material and to project it to the left of the lens 35. Lens 35 may be provided with a suitable iris diaphragm or other stop means, not shown in order to adjust the light output of the lens. On the other side of partition 28 is another mirror 36 which is also positioned at a 45° angle to the vertical and is adapted to reflect the beam of light coming from the lens 35 at a 90° angle upwardly towards the film holder. Mirror 36 is likewise mounted on a rack arrangement 37 and is supported by member 38. The mirror 36 being front surfaced also requires protection from dust and the like. This is provided by glass cover plates 39 which are coated by the usual hard optical coating compositions.

Rack arrangement 32 and rack arrangement 37 are in operative relationship with respective pinions which are operated by respective drive mechanisms, more of which will be said later. Each rack arrangement slides into light-tight tunnels which are located through openings in partition 28 and extend into the opposite or adjoining respective compartments.

In order to provide stability, the rack arrangement 32 for mirror 31 consists of two identical parallel racks 32a and 32b which are adapted to slide along angle irons 49. Each of the two racks 32a and 32b is provided with a cooperating pinion. Both pinions are keyed on a single drive shaft. Additionally, the other mirror 36 located in the other compartment is mounted on two racks 37a and 37b. Furthermore, suitable pinions mounted on a single shaft are provided to move the latter racks. The racks 37a and 37b slide through two openings in partition 28 into enclosed oblong tunnels 40 located in the adjoining compartment. The openings in partition 28 accommodating the racks of both mirrors are laterally disposed to one another. For instance, racks 32a and 32b are positioned outwardly on both sides of inner racks 37a and 37b. Enclosed tunnels 41 are provided for racks 32a and 32b.

The curtain 22a is reeled onto roller 51 which is suitably driven, more about which will be stated below. On the other hand, curtain 22b passes over idling roller 52 and is weighted by a suitable weight 53 sewn into the hem of curtain 22b. On the other side of the compartment, curtain 23b is wound on roller 54 which is suitably driven. At the other side thereof, curtain 23a passes over idling roller 55 and extends downwardly by means of weight 56 which is sewn into the hem of the curtain.

In the compartment having the copy holder, two parallel rails 57 are positioned horizontally near the upper side walls 13. These two rails 57 have a carriage 58 mounted thereon. The carriage carries a light source 59 which is designed to throw light from it upwardly at a 30° angle through a slit 60, as seen in FIGURE 5, towards the graphic material held face downwardly in the copy holder. The carriage is adapted to traverse the rails from left to right in the compartment by means of an endless cable arrangement which is attached to the carriage. Cable 61 passes around idling pulleys 62 and 63 and extends downwardly and passes around driven pulley 64 which is driven by means of electric motor 65. Suitable switch means is provided which turns off the motor when the light carriage 58 moves from the left position to the extreme right position. By employing a suitable motor, the same may be reversed so that the carriage is then returned to its starting position.

Attention is now directed to FIGURE 2 for a further detailed description of the driving mechanism for the various movable elements in the camera. Since the elements in both compartments are essentially the same, an exhaustive detailed consideration of only one side will be presented. As for the other side, a more rapid explanation will be provided.

As was stated, curtain 23b is wound on roller 54. Roller 54 is suitably mounted on shaft 71 which is journaled in the two side walls 13. Keyed on shaft 71 is a sprocket gear 72. An endless chain 73 is permitted to play over sprocket gear 72. The other end of the loop formed by the chain plays over sprocket gear 74. This sprocket gear is mounted on a shaft 75 which is mounted through one side wall 13. In juxtaposition and mounted concentrically is a larger sprocket gear 76. The outermost end portion of shaft 75 has a crank member 77 keyed thereto for manual manipulation. A second endless chain 78 is mounted about sprocket gear 76 and sprocket gear 79 which is keyed on elongated shaft 81. Shaft 81 thrusts or projects through the forward side of wall 13 and is journaled therethrough. The other end of shaft 81 is journaled in a suitable support bracket. It will be seen that pinions 83 and 84 are also keyed on shaft 81 and are adapted to operate rack 37 upon which the mirror 36 is mounted.

On the portion of shaft 81 which thrusts through side wall 13, a pulley 85 is secured. Additionally, vertically above, another pulley 86 is keyed to a stub shaft 87 which is mounted on the outside of side wall 13. An endless tape 88 plays around pulleys 85 and 86. A scale marking arrangement is imprinted on the peripheral surface of the tape. In FIGURE 1, the tapes 88 are exposed; this is due to the removal of a suitable cover plate 89 which is shown in place in FIGURE 4.

It will be seen that in operation, by moving crank 77, shaft 75 is rotated so that sprocket 76 keyed thereto will rotate sprocket gear 79 through endless chain 78. Additionally, sprocket gear 74 being also keyed to shaft 75 is rotated as crank 77 is turned. Endless chain 73 operates on sprocket gear 72, thereby through shaft 71 turns roller 54. As crank 77 is rotated, it will be seen that roller 54 will either unwind or wind the roller curtain 23b. At the same time, through the movement of shaft 81, pinions 83 and 84 will operate on racks 37 thereby moving the rack and the mirror 36 mounted thereon. The arrangement is constructed in a manner so that as film holder frame 20 is moved, for instance, to the right by virtue of winding in curtain 23b onto roller 54, rack 37 is moved also to the right thereby moving mirror 36. The net result is to keep mirror 36 in a position which is directly centered beneath film holder 20. Conversely, as the crank 77 is turned counterclockwise, curtain 23b is unrolled from roller 54. Weight 56 pulls the film holder frame 20 to the left.

Likewise, an identical driving mechanism is provided for curtains 22a and 22b. From FIGURE 2 it can be seen that the driving mechanism for these curtains duplicate the driving mechanism for curtains 23a and 23b. It will be noted that crank 90 operates sprocket gears 91 and 92 which are keyed to the same shaft on which the crank is mounted. Sprocket gear 91 is connected to and drives sprocket gear 93 by means of endless chain 94. Similarly, sprocket gear 92 is connected to and drives sprocket gear 95 by means of endless chain 96. Sprocket gear 93 drives roller 51 while sprocket gear 95 drives shaft 97 to which it is keyed. Pinions 42 and 43 are also keyed to shaft 97. Of course, rotation of pinions 42 and 43 effects movement of racks 32a and 32b.

As can be seen, a similar pulley 85 is provided on shaft 97 for operation of an indicia imprinted tape 88 as in connection with the other tape 88.

The manipulation of crank 90 provides for synchronous movement of both graphic copy holder 21 and mirror 31 thereby insuring maintenance of mirror 31 in a centered position beneath the copy holder 21.

In operation, to-be-copied graphic material is placed face down in the holder 21. The speed with which the light source tranverses the copy gives the exposure time.

This along with the diaphragm setting of lens 35 controls the ultimate light that falls on the film in the holder 20. The movement of carriage 58 is controlled by a conventional rheostat or other suitable speed control (not shown) which operates to control the speed of the motor 65.

Tapes 88 are employed to give automatic readings of the distances of the respective mirrors from the lens 35, thereby indicating the ratio of enlargement or reduction of the projected image onto the film in the holder 20.

Suitable doors are provided in housing 11 to permit ready access to the interior of the housing to effect repairs and adjustments as required.

Without further anaylsis, it will be readily observed that the present invention described hereinabove is completely self contained within a light tight housing which is accompuished in part by the employment of light tight curtains. Furthermore, it will be seen that the device of the present invention may be operated without the need of focusing the lens in as much as the lens is secured to a stationary mount within the housing. By positioning the graphic material holder and sensitized film holder on a common plane, ready operation may be accomplished. The use of a travelling light within the housing itself provides a unique exposure method not heretofore used. Other attributes can be discerned such as the unusual compactness of the camera making for conservation of floor space.

It will be apparent that many changes and modifications of the several features described herein may be made without departing from the spirit and scope of the invention. Therefore, it is to be understood that the foregoing description is by way of illustration of the invention rather than limitation of the invention.

What is claimed is:

1. A camera comprising an elongated horizontal housing, said housing having first and second end walls, side walls, a bottom wall and a vertical partition dividing said housing into a first compartment between said first end wall and said partition and a second compartment between said second end wall and said partition, a fixed lens system mounted in said partition to provide light communication between said compartments, a copy holder slidably mounted for longitudinal movement in the upper portion of said housing between said partition and said first end wall, a take up means adjacent said first end wall, a flexible opaque web secured to said copy holder and operatively associated with said take up means to provide a light tight closure between said copy holder and said first end wall, a second take up means adjacent said partition, a second flexible opaque web secured to said copy holder and operatively associated with said second take up means to provide a light tight closure between said copy holder and said partition, a film holder slidably mounted for longitudinal movement in the upper portion of said housing between said partition and said second end wall, a third take up means adjacent said second end wall, a third flexible opaque web secured to said film holder and operatively associated with said third take up means to provide a light tight closure between said film holder and said second end wall, a fourth take up means adjacent said partition, a fourth flexible opaque web secured to said film holder and operatively associated with said fourth take up means to provide a light tight closure between said film holder and said partition, a light reflecting means slidably disposed in said first compartment below said copy holder for reflecting light rays from said copy holder to said lens, a second light reflecting means slidably disposed in said second compartment for reffecting light rays from said lens to said film holder, means for simultaneously moving said copy holder and said first light reflecting means toward or away from said partition, means for simultaneously moving said film holder and said second light reflecting means toward or away from said partition, a carriage slidably mounted in said first compartment between said copy holder and said first light reflecting means, variable speed means for moving said carriage from a position adjacent said partition to a position adjacent said first end wall and return, a light source housed in said carriage, said carriage having an elongated narrow slit so disposed as to project an elongated narrow beam of light to the lower surface of said copy holder in advance of said carriage as the carriage moves from said partition toward said first end wall to progressively scan copy in said copy holder, whereby a progressive image of the copy is reflected through said lens and progressively across a film carried by said film holder, the speed of movement of said carriage determining the duration of exposure of the film.

2. A camera as defined in claim 1, in which said first and third take up means comprise weights secured to said first and third webs and said second and fourth take up means comprise winding rollers receiving said second and fourth webs.

3. A camera as defined in claim 2, in which the means for moving said copy holder and said film holder comprises said webs, weights and winding rollers and the means for moving said first and second light reflecting means comprises separate rack and pinion drives, manual means for simultaneously operating the winding roller associated with said copy holder and the rack and pinion drive for said first light reflecting means and a second manual means for simultaneously operating the winding roller associated with said film holder and the rack and pinion drive for said second light reflecting means.

4. A camera as defined in claim 1, in which said variable speed means for moving said carriage comprises a variable speed reversible electric motor, a drive pulley on said motor and an endless flexible means engaging said pulley and trained over pulleys at the opposite limits of travel of said carriage, said flexible means being fixed to said carriage.

5. A camera comprising an elongated horizontal housing, said housing having first and second end walls, side walls, a bottom wall and a vertical partition dividing said housing into a first compartment between said first end wall and said partition and a second compartment between said second end wall and said partition, a lens system mounted in said partition to provide light communication between said compartments, a copy holder slidably mounted for longitudinal movement in the upper portion of said housing between said partition and said first end wall, a take up means adjacent said first end wall, a flexible opaque web secured to said copy holder and operatively associated with said take up means to provide a light tight closure between said copy holder and said first end wall, a second take up means adjacent said partition, a second flexible opaque web secured to said copy holder and operatively associated with said second take up means to provide a light tight closure between said copy holder and said partition, a film holder slidably mounted for longitudinal movement in the upper portion of said housing between said partition and said second end wall, a third take up means adjacent said second end wall, a third flexible opaque web secured to said film holder and operatively associated with said third take up means to provide a light tight closure between said film holder and said second end wall, a fourth take up means adjacent said partition, a fourth flexible opaque web secured to said film holder and operatively associated with said fourth take up means to provide a light tight closure between said film holder and said partition, a light reflecting means slidably disposed in said first compartment below said copy holder for reflecting light rays from said copy holder to said lens, a second light reflecting means slidably disposed in said second compartment for reflecting light rays from said lens to said film holder, means for simultaneously moving said copy holder and said first light reflecting means toward or away from said partition, means for simultaneously moving said film holder and said second light reflecting means toward or away from said partition, a carriage slidably mounted in said first compartment between said copy holder and said first light reflecting means, variable speed means for moving said carriage from a position adjacent said partition to a position adjacent said first end wall and return, a light source mounted on said carriage, means associated with said light source to project an elongated narrow beam of light to the lower surface of said copy holder in advance of said carriage as said carriage moves from said partition towards said first end wall to progressively scan copy in said copy holder, whereby a progressive image of the copy is reflected through said lens and progressively across a film carried by said film holder, the speed of movement of said carriage determining the duration of exposure of the film.

6. A camera comprising an elongated horizontal housing, said housing having first and second end walls, side walls, a bottom wall and a vertical partition dividing said housing into a first compartment between said first end wall and said partition and a second compartment between said second end wall and said partition, a lens system mounted in said partition to provide light communication between said compartments, a copy holder slidably mounted for longitudinal movement in the upper portion of said housing between said partition and said first end wall, a take up means adjacent said first end wall, a flexible opaque web secured to said copy holder and operatively associated with said take up means to provide a light tight closure between said copy holder and said first end wall, a second take up means adjacent said partition, a second flexible opaque web secured to said copy holder and operatively associated with said second take up means to provide a light tight closure between said copy holder and said partition, a film holder slidably mounted for longitudinal movement in the upper portion of said housing between said partition and said second end wall, a third take up means adjacent said second end wall, a third flexible opaque web secured to said film holder and operatively associated with said third take up means to provide a light tight closure between said film holder and said second end wall, a fourth take up means adjacent said partition, a fourth flexible opaque web secured to said film holder and operatively associated with said fourth take up means to provide a light tight closure between said film holder and said partition, a light reflecting means slidably disposed in said first compartment below said copy holder for reflecting light rays from said copy holder to said lens, a second light reflecting means slidably disposed in said second compartment for reflecting light rays from said lens to said film holder, means for simultaneously moving said copy holder and said first light reflecting means toward or away from said partition, means for simultaneously moving said film holder and said second light reflecting means toward or away from said partition, a light source slidably mounted in said first compartment between said copy holder and said first light reflecting means, variable speed means for moving said light source from a position adjacent said partition to a position adjacent said first end wall and return, means associated with said light source to project an elongated narrow beam of light to the lower surface of said copy holder in advance of said light source as said light source moves from said partition toward said first end wall to progressively scan copy in said copy holder, whereby a progressive image of the copy is reflected through said lens and progressively across a film carried by said film holder, the speed of movement of said light source determining the duration of exposure of the film.

7. A camera comprising an elongated horizontal housing, said housing having first and second end walls, side walls, a bottom wall and a vertical partition dividing said housing into a first compartment between said first end wall and said partition and a second compartment between said second end wall and said partition, a lens system mounted in said partition to provide light communication between said compartments, a copy holder slidably mounted for longitudinal movement in the upper portion of said housing between said partition and said first end wall, expansible and contractible means to provide a light tight closure between said copy holder and said first end wall, a second expansible and contractible means to provide a light tight closure between said copy holder and said partition, a film holder slidably mounted for longitudinal movement in the upper portion of said housing between said partition and said second end wall, a third expansible and contractible means to provide a light tight closure between said film holder and said second end wall, a fourth expansible and contractible means to provide a light tight closure between said film holder and said partition, a light reflecting means slidably disposed in said first compartment below said copy holder for reflecting light rays from said copy holder to said lens, a second light reflecting means slidably disposed in said second compartment for reflecting light rays from said lens to said film holder, means for simultaneously moving said copy holder and said first light reflecting means toward or away from said partition, means for simultaneously moving said film holder and said second light reflecting meaans toward or away from said partition, a light source slidably mounted in said first compartment between said copy holder and said first light reflecting means, variable speed means for moving said light source from a position adjacent said partition to a position adjacent said first end wall and return, means associated with said light source to project an elongated narrow beam of light to the lower surface of said copy holder in advance of said light source as said light source moves from said partition toward said first end wall to progressively scan copy in said copy holder, whereby a progressive image of the copy is reflected through said lens and progressively across a film carried by said film holder, the speed of movement of said light source determining the duration of exposure of the film.

References Cited in the file of this patent
UNITED STATES PATENTS

| | | |
|---|---|---|
| 2,431,612 | Furnas | Nov. 25, 1947 |
| 2,823,579 | Fitter | Feb. 18, 1958 |
| 2,830,491 | Domeshek | Apr. 15, 1958 |